United States Patent [19]

Hardin et al.

[11] 3,708,786

[45] Jan. 2, 1973

[54] STORED PROGRAM FORMAT GENERATOR

[75] Inventors: Robert H. Hardin; Keith H. Hill, both of Littleton, Colo.

[73] Assignee: Martin Marietta Corporation, New York, N.Y.

[22] Filed: Oct. 20, 1971

[21] Appl. No.: 190,863

[52] U.S. Cl. ............................340/172.5, 179/15 BV

[51] Int. Cl. ................................G06f 5/06, H04j 3/06

[58] Field of Search ..340/172.5, 147; 444/1; 178/50, 178/69.5; 179/15 BV

[56] References Cited

UNITED STATES PATENTS

| | | | |
|---|---|---|---|
| 3,270,321 | 8/1966 | Berkowitz | 340/147 |
| 3,261,001 | 7/1966 | Magnin | 340/172.5 |
| 3,431,559 | 3/1969 | Webb | 340/172.5 |
| 3,497,627 | 2/1970 | Blasbalg et al. | 340/172.5 |
| 3,531,776 | 9/1970 | Sloate | 340/172.5 |
| 3,546,684 | 12/1970 | Maxwell et al. | 340/172.5 |
| 3,525,813 | 8/1970 | Taylor et al. | 178/69.5 X |
| 3,534,264 | 10/1970 | Blasbalg et al. | 179/15 BV X |
| 3,576,396 | 4/1971 | Sloate | 178/69.5 F |
| 3,665,417 | 5/1972 | Low et al | 340/172.5 |

*Primary Examiner*—Paul J. Henon
*Assistant Examiner*—Jan E. Rhoads
*Attorney*—Phillip L. De Arment

[57] ABSTRACT

Disclosed is a unique stored program format generator for sequentially sampling a plurality of data channels at various sampling rates. The format generator accomplishes addressing of subcommutated data channels with the use of a single counter whose contents are combined with stored masking functions corresponding to different subcommutation factors. The combined word acts as an address word to access the generator memory at the location storing the address of the desired subcommutated data channel.

7 Claims, 10 Drawing Figures

SAMPLING RATES REQUIRED IN EXAMPLE FORMAT

| NUMBER OF CHANNELS | SAMPLES PER SEC. | WORDS PER FRAME | SUBCOMMUTATION FACTOR |
|---|---|---|---|
| GROUP I: 47 | 120 | 47 | ---- |
| GROUP II: 35 | 24 | 7 | 5 |
| GROUP III: 40 | 12 | 4 | 10 |
| GROUP IV: 60 | 4 | 2 | 30 |
| TOTAL 182 | --- | 60 | ---- |

INVENTORS
ROBERT H. HARDIN
KEITH H. HILL

BY Sughrue, Rothwell, Mion, Zinn & Macpeak
ATTORNEYS

SEE FIG. 2B

FIG. 2A

| FRAME \ ADDRESS WORD | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| 1 | 48 | 1 | 2 | 3 | 4 | 53 | 5 | 6 | 7 | 8 | 63 | 9 | 10 | 11 | 12 | 68 | 13 | 14 | 15 | 16 | 98 | 17 | 18 | 19 | 20 | 103 | 21 | 22 | 23 | 24 |
| 2 | 49 | 1 | 2 | 3 | 4 | 54 | 5 | 6 | 7 | 8 | 64 | 9 | 10 | 11 | 12 | 69 | 13 | 14 | 15 | 16 | 99 | 17 | 18 | 19 | 20 | 104 | 21 | 22 | 23 | 24 |
| 3 | 50 | 1 | 2 | 3 | 4 | 55 | 5 | 6 | 7 | 8 | 65 | 9 | 10 | 11 | 12 | 70 | 13 | 14 | 15 | 16 | 100 | 17 | 18 | 19 | 20 | 105 | 21 | 22 | 23 | 24 |
| 4 | 51 | 1 | 2 | 3 | 4 | 56 | 5 | 6 | 7 | 8 | 66 | 9 | 10 | 11 | 12 | 71 | 13 | 14 | 15 | 16 | 101 | 17 | 18 | 19 | 20 | 106 | 21 | 22 | 23 | 24 |
| 5 | 52 | 1 | 2 | 3 | 4 | 57 | 5 | 6 | 7 | 8 | 67 | 9 | 10 | 11 | 12 | 72 | 13 | 14 | 15 | 16 | 102 | 17 | 18 | 19 | 20 | 107 | 21 | 22 | 23 | 24 |
| 6 | 48 | 1 | 2 | 3 | 4 | 58 | 5 | 6 | 7 | 8 | 63 | 9 | 10 | 11 | 12 | 73 | 13 | 14 | 15 | 16 | 98 | 17 | 18 | 19 | 20 | 108 | 21 | 22 | 23 | 24 |
| 7 | 49 | 1 | 2 | 3 | 4 | 59 | 5 | 6 | 7 | 8 | 64 | 9 | 10 | 11 | 12 | 74 | 13 | 14 | 15 | 16 | 99 | 17 | 18 | 19 | 20 | 109 | 21 | 22 | 23 | 24 |
| 8 | 50 | 1 | 2 | 3 | 4 | 60 | 5 | 6 | 7 | 8 | 65 | 9 | 10 | 11 | 12 | 75 | 13 | 14 | 15 | 16 | 100 | 17 | 18 | 19 | 20 | 110 | 21 | 22 | 23 | 24 |
| 9 | 51 | 1 | 2 | 3 | 4 | 61 | 5 | 6 | 7 | 8 | 66 | 9 | 10 | 11 | 12 | 76 | 13 | 14 | 15 | 16 | 101 | 17 | 18 | 19 | 20 | 111 | 21 | 22 | 23 | 24 |
| 10 | 52 | 1 | 2 | 3 | 4 | 62 | 5 | 6 | 7 | 8 | 67 | 9 | 10 | 11 | 12 | 77 | 13 | 14 | 15 | 16 | 102 | 17 | 18 | 19 | 20 | 112 | 21 | 22 | 23 | 24 |
| 11 | 48 | 1 | 2 | 3 | 4 | 53 | 5 | 6 | 7 | 8 | 63 | 9 | 10 | 11 | 12 | 78 | 13 | 14 | 15 | 16 | 98 | 17 | 18 | 19 | 20 | 103 | 21 | 22 | 23 | 24 |
| 12 | 49 | 1 | 2 | 3 | 4 | 54 | 5 | 6 | 7 | 8 | 64 | 9 | 10 | 11 | 12 | 79 | 13 | 14 | 15 | 16 | 99 | 17 | 18 | 19 | 20 | 104 | 21 | 22 | 23 | 24 |
| 13 | 50 | 1 | 2 | 3 | 4 | 55 | 5 | 6 | 7 | 8 | 65 | 9 | 10 | 11 | 12 | 80 | 13 | 14 | 15 | 16 | 100 | 17 | 18 | 19 | 20 | 105 | 21 | 22 | 23 | 24 |
| 14 | 51 | 1 | 2 | 3 | 4 | 56 | 5 | 6 | 7 | 8 | 66 | 9 | 10 | 11 | 12 | 81 | 13 | 14 | 15 | 16 | 101 | 17 | 18 | 19 | 20 | 106 | 21 | 22 | 23 | 24 |
| 15 | 52 | 1 | 2 | 3 | 4 | 57 | 5 | 6 | 7 | 8 | 67 | 9 | 10 | 11 | 12 | 82 | 13 | 14 | 15 | 16 | 102 | 17 | 18 | 19 | 20 | 107 | 21 | 22 | 23 | 24 |
| 16 | 48 | 1 | 2 | 3 | 4 | 58 | 5 | 6 | 7 | 8 | 63 | 9 | 10 | 11 | 12 | 83 | 13 | 14 | 15 | 16 | 98 | 17 | 18 | 19 | 20 | 108 | 21 | 22 | 23 | 24 |
| 17 | 49 | 1 | 2 | 3 | 4 | 59 | 5 | 6 | 7 | 8 | 64 | 9 | 10 | 11 | 12 | 84 | 13 | 14 | 15 | 16 | 99 | 17 | 18 | 19 | 20 | 109 | 21 | 22 | 23 | 24 |
| 18 | 50 | 1 | 2 | 3 | 4 | 60 | 5 | 6 | 7 | 8 | 65 | 9 | 10 | 11 | 12 | 85 | 13 | 14 | 15 | 16 | 100 | 17 | 18 | 19 | 20 | 110 | 21 | 22 | 23 | 24 |
| 19 | 51 | 1 | 2 | 3 | 4 | 61 | 5 | 6 | 7 | 8 | 66 | 9 | 10 | 11 | 12 | 86 | 13 | 14 | 15 | 16 | 101 | 17 | 18 | 19 | 20 | 111 | 21 | 22 | 23 | 24 |
| 20 | 52 | 1 | 2 | 3 | 4 | 62 | 5 | 6 | 7 | 8 | 67 | 9 | 10 | 11 | 12 | 87 | 13 | 14 | 15 | 16 | 102 | 17 | 18 | 19 | 20 | 112 | 21 | 22 | 23 | 24 |
| 21 | 48 | 1 | 2 | 3 | 4 | 53 | 5 | 6 | 7 | 8 | 63 | 9 | 10 | 11 | 12 | 88 | 13 | 14 | 15 | 16 | 98 | 17 | 18 | 19 | 20 | 103 | 21 | 22 | 23 | 24 |
| 22 | 49 | 1 | 2 | 3 | 4 | 54 | 5 | 6 | 7 | 8 | 64 | 9 | 10 | 11 | 12 | 89 | 13 | 14 | 15 | 16 | 99 | 17 | 18 | 19 | 20 | 104 | 21 | 22 | 23 | 24 |
| 23 | 50 | 1 | 2 | 3 | 4 | 55 | 5 | 6 | 7 | 8 | 65 | 9 | 10 | 11 | 12 | 90 | 13 | 14 | 15 | 16 | 100 | 17 | 18 | 19 | 20 | 105 | 21 | 22 | 23 | 24 |
| 24 | 51 | 1 | 2 | 3 | 4 | 56 | 5 | 6 | 7 | 8 | 66 | 9 | 10 | 11 | 12 | 91 | 13 | 14 | 15 | 16 | 101 | 17 | 18 | 19 | 20 | 106 | 21 | 22 | 23 | 24 |
| 25 | 52 | 1 | 2 | 3 | 4 | 57 | 5 | 6 | 7 | 8 | 67 | 9 | 10 | 11 | 12 | 92 | 13 | 14 | 15 | 16 | 102 | 17 | 18 | 19 | 20 | 107 | 21 | 22 | 23 | 24 |
| 26 | 48 | 1 | 2 | 3 | 4 | 58 | 5 | 6 | 7 | 8 | 63 | 9 | 10 | 11 | 12 | 93 | 13 | 14 | 15 | 16 | 98 | 17 | 18 | 19 | 20 | 108 | 21 | 22 | 23 | 24 |
| 27 | 49 | 1 | 2 | 3 | 4 | 59 | 5 | 6 | 7 | 8 | 64 | 9 | 10 | 11 | 12 | 94 | 13 | 14 | 15 | 16 | 99 | 17 | 18 | 19 | 20 | 109 | 21 | 22 | 23 | 24 |
| 28 | 50 | 1 | 2 | 3 | 4 | 60 | 5 | 6 | 7 | 8 | 65 | 9 | 10 | 11 | 12 | 95 | 13 | 14 | 15 | 16 | 100 | 17 | 18 | 19 | 20 | 110 | 21 | 22 | 23 | 24 |
| 29 | 51 | 1 | 2 | 3 | 4 | 61 | 5 | 6 | 7 | 8 | 66 | 9 | 10 | 11 | 12 | 96 | 13 | 14 | 15 | 16 | 101 | 17 | 18 | 19 | 20 | 111 | 21 | 22 | 23 | 24 |
| 30 | 52 | 1 | 2 | 3 | 4 | 62 | 5 | 6 | 7 | 8 | 67 | 9 | 10 | 11 | 12 | 97 | 13 | 14 | 15 | 16 | 102 | 17 | 18 | 19 | 20 | 112 | 21 | 22 | 23 | 24 |

FIG. 2B

| FRAME \ ADDRESS WORD | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| 1 | 113 | 25 | 26 | 27 | 28 | 118 | 29 | 30 | 31 | 32 | 128 | 33 | 34 | 35 | 36 | 133 | 37 | 38 | 39 | 40 | 163 | 41 | 42 | 43 | 44 | 168 | 45 | 46 | 47 | 178 |
| 2 | 114 | 25 | 26 | 27 | 28 | 119 | 29 | 30 | 31 | 32 | 129 | 33 | 34 | 35 | 36 | 134 | 37 | 38 | 39 | 40 | 164 | 41 | 42 | 43 | 44 | 169 | 45 | 46 | 47 | 179 |
| 3 | 115 | 25 | 26 | 27 | 28 | 120 | 29 | 30 | 31 | 32 | 130 | 33 | 34 | 35 | 36 | 135 | 37 | 38 | 39 | 40 | 165 | 41 | 42 | 43 | 44 | 170 | 45 | 46 | 47 | 180 |
| 4 | 116 | 25 | 26 | 27 | 28 | 121 | 29 | 30 | 31 | 32 | 131 | 33 | 34 | 35 | 36 | 136 | 37 | 38 | 39 | 40 | 166 | 41 | 42 | 43 | 44 | 171 | 45 | 46 | 47 | 181 |
| 5 | 117 | 25 | 26 | 27 | 28 | 122 | 29 | 30 | 31 | 32 | 132 | 33 | 34 | 35 | 36 | 137 | 37 | 38 | 39 | 40 | 167 | 41 | 42 | 43 | 44 | 172 | 45 | 46 | 47 | 182 |
| 6 | 113 | 25 | 26 | 27 | 28 | 123 | 29 | 30 | 31 | 32 | 128 | 33 | 34 | 35 | 36 | 138 | 37 | 38 | 39 | 40 | 163 | 41 | 42 | 43 | 44 | 173 | 45 | 46 | 47 | 178 |
| 7 | 114 | 25 | 26 | 27 | 28 | 124 | 29 | 30 | 31 | 32 | 129 | 33 | 34 | 35 | 36 | 139 | 37 | 38 | 39 | 40 | 164 | 41 | 42 | 43 | 44 | 174 | 45 | 46 | 47 | 179 |
| 8 | 115 | 25 | 26 | 27 | 28 | 125 | 29 | 30 | 31 | 32 | 130 | 33 | 34 | 35 | 36 | 140 | 37 | 38 | 39 | 40 | 165 | 41 | 42 | 43 | 44 | 175 | 45 | 46 | 47 | 180 |
| 9 | 116 | 25 | 26 | 27 | 28 | 126 | 29 | 30 | 31 | 32 | 131 | 33 | 34 | 35 | 36 | 141 | 37 | 38 | 39 | 40 | 166 | 41 | 42 | 43 | 44 | 176 | 45 | 46 | 47 | 181 |
| 10 | 117 | 25 | 26 | 27 | 28 | 127 | 29 | 30 | 31 | 32 | 132 | 33 | 34 | 35 | 36 | 142 | 37 | 38 | 39 | 40 | 167 | 41 | 42 | 43 | 44 | 177 | 45 | 46 | 47 | 182 |
| 11 | 113 | 25 | 26 | 27 | 28 | 118 | 29 | 30 | 31 | 32 | 128 | 33 | 34 | 35 | 36 | 143 | 37 | 38 | 39 | 40 | 163 | 41 | 42 | 43 | 44 | 168 | 45 | 46 | 47 | 178 |
| 12 | 114 | 25 | 26 | 27 | 28 | 119 | 29 | 30 | 31 | 32 | 129 | 33 | 34 | 35 | 36 | 144 | 37 | 38 | 39 | 40 | 164 | 41 | 42 | 43 | 44 | 169 | 45 | 46 | 47 | 179 |
| 13 | 115 | 25 | 26 | 27 | 28 | 120 | 29 | 30 | 31 | 32 | 130 | 33 | 34 | 35 | 36 | 145 | 37 | 38 | 39 | 40 | 165 | 41 | 42 | 43 | 44 | 170 | 45 | 46 | 47 | 180 |
| 14 | 116 | 25 | 26 | 27 | 28 | 121 | 29 | 30 | 31 | 32 | 131 | 33 | 34 | 35 | 36 | 146 | 37 | 38 | 39 | 40 | 166 | 41 | 42 | 43 | 44 | 171 | 45 | 46 | 47 | 181 |
| 15 | 117 | 25 | 26 | 27 | 28 | 122 | 29 | 30 | 31 | 32 | 132 | 33 | 34 | 35 | 36 | 147 | 37 | 38 | 39 | 40 | 167 | 41 | 42 | 43 | 44 | 172 | 45 | 46 | 47 | 182 |
| 16 | 113 | 25 | 26 | 27 | 28 | 123 | 29 | 30 | 31 | 32 | 128 | 33 | 34 | 35 | 36 | 148 | 37 | 38 | 39 | 40 | 163 | 41 | 42 | 43 | 44 | 173 | 45 | 46 | 47 | 178 |
| 17 | 114 | 25 | 26 | 27 | 28 | 124 | 29 | 30 | 31 | 32 | 129 | 33 | 34 | 35 | 36 | 149 | 37 | 38 | 39 | 40 | 164 | 41 | 42 | 43 | 44 | 174 | 45 | 46 | 47 | 179 |
| 18 | 115 | 25 | 26 | 27 | 28 | 125 | 29 | 30 | 31 | 32 | 130 | 33 | 34 | 35 | 36 | 150 | 37 | 38 | 39 | 40 | 165 | 41 | 42 | 43 | 44 | 175 | 45 | 46 | 47 | 180 |
| 19 | 116 | 25 | 26 | 27 | 28 | 126 | 29 | 30 | 31 | 32 | 131 | 33 | 34 | 35 | 36 | 151 | 37 | 38 | 39 | 40 | 166 | 41 | 42 | 43 | 44 | 176 | 45 | 46 | 47 | 181 |
| 20 | 117 | 25 | 26 | 27 | 28 | 127 | 29 | 30 | 31 | 32 | 132 | 33 | 34 | 35 | 36 | 152 | 37 | 38 | 39 | 40 | 167 | 41 | 42 | 43 | 44 | 177 | 45 | 46 | 47 | 182 |
| 21 | 113 | 25 | 26 | 27 | 28 | 118 | 29 | 30 | 31 | 32 | 128 | 33 | 34 | 35 | 36 | 153 | 37 | 38 | 39 | 40 | 163 | 41 | 42 | 43 | 44 | 168 | 45 | 46 | 47 | 178 |
| 22 | 114 | 25 | 26 | 27 | 28 | 119 | 29 | 30 | 31 | 32 | 129 | 33 | 34 | 35 | 36 | 154 | 37 | 38 | 39 | 40 | 164 | 41 | 42 | 43 | 44 | 169 | 45 | 46 | 47 | 179 |
| 23 | 115 | 25 | 26 | 27 | 28 | 120 | 29 | 30 | 31 | 32 | 130 | 33 | 34 | 35 | 36 | 155 | 37 | 38 | 39 | 40 | 165 | 41 | 42 | 43 | 44 | 170 | 45 | 46 | 47 | 180 |
| 24 | 116 | 25 | 26 | 27 | 28 | 121 | 29 | 30 | 31 | 32 | 131 | 33 | 34 | 35 | 36 | 156 | 37 | 38 | 39 | 40 | 166 | 41 | 42 | 43 | 44 | 171 | 45 | 46 | 47 | 181 |
| 25 | 117 | 25 | 26 | 27 | 28 | 122 | 29 | 30 | 31 | 32 | 132 | 33 | 34 | 35 | 36 | 157 | 37 | 38 | 39 | 40 | 167 | 41 | 42 | 43 | 44 | 172 | 45 | 46 | 47 | 182 |
| 26 | 113 | 25 | 26 | 27 | 28 | 123 | 29 | 30 | 31 | 32 | 128 | 33 | 34 | 35 | 36 | 158 | 37 | 38 | 39 | 40 | 163 | 41 | 42 | 43 | 44 | 173 | 45 | 46 | 47 | 178 |
| 27 | 114 | 25 | 26 | 27 | 28 | 124 | 29 | 30 | 31 | 32 | 129 | 33 | 34 | 35 | 36 | 159 | 37 | 38 | 39 | 40 | 164 | 41 | 42 | 43 | 44 | 174 | 45 | 46 | 47 | 179 |
| 28 | 115 | 25 | 26 | 27 | 28 | 125 | 29 | 30 | 31 | 32 | 130 | 33 | 34 | 35 | 36 | 160 | 37 | 38 | 39 | 40 | 165 | 41 | 42 | 43 | 44 | 175 | 45 | 46 | 47 | 180 |
| 29 | 116 | 25 | 26 | 27 | 28 | 126 | 29 | 30 | 31 | 32 | 131 | 33 | 34 | 35 | 36 | 161 | 37 | 38 | 39 | 40 | 166 | 41 | 42 | 43 | 44 | 176 | 45 | 46 | 47 | 181 |
| 30 | 117 | 25 | 26 | 27 | 28 | 127 | 29 | 30 | 31 | 32 | 132 | 33 | 34 | 35 | 36 | 162 | 37 | 38 | 39 | 40 | 167 | 41 | 42 | 43 | 44 | 177 | 45 | 46 | 47 | 182 |

SEE FIG. 2A

FIG. 7

MEMORY CODE FOR SAMPLE FORMAT

| MEMORY LOCATION | MEMORY CONTENT 9 8 7 6 5 4 3 2 | LSB | MEMORY LOCATION | MEMORY CONTENT 9 8 7 6 5 4 3 2 | LSB | MEMORY LOCATION | MEMORY CONTENT 9 8 7 6 5 4 3 2 | LSB | MEMORY LOCATION | MEMORY CONTENT 9 8 7 6 5 4 3 2 | LSB |
|---|---|---|---|---|---|---|---|---|---|---|---|
| 1 | 61 | 1 | 31 | 153 | 1 | 61 | 0 0 0 0 0 1 1 1 | | 165-167 | UNUSED | |
| 2 | 1 | 0 | 32 | 25 | 0 | 62-66 | 48-52 | | 168-172 | 123-127 | |
| 3 | 2 | 0 | 33 | 26 | 0 | 67 | 0 0 0 0 1 1 1 1 | | 173 | 0 0 0 0 0 1 1 1 | |
| 4 | 3 | 0 | 34 | 27 | 0 | 68-72 | 53-57 | | 174-178 | 128-132 | |
| 5 | 4 | 0 | 35 | 28 | 0 | 73-75 | UNUSED | | 179 | 0 0 1 1 1 1 1 1 | |
| 6 | 67 | 1 | 36 | 159 | 1 | 76-80 | 58-62 | | 180-184 | 133-137 | |
| 7 | 5 | 0 | 37 | 29 | 0 | 81 | 0 0 0 0 0 1 1 1 | | 185-187 | UNUSED | |
| 8 | 6 | 0 | 38 | 30 | 0 | 82-86 | 63-67 | | 188-192 | 138-142 | |
| 9 | 7 | 0 | 39 | 31 | 0 | 87 | 0 0 1 1 1 1 1 1 | | 193-195 | UNUSED | |
| 10 | 8 | 0 | 40 | 32 | 0 | 88-92 | 68-72 | | 196-200 | 143-147 | |
| 11 | 81 | 1 | 41 | 173 | 1 | 93-95 | UNUSED | | 201-203 | UNUSED | |
| 12 | 9 | 0 | 42 | 33 | 0 | 96-100 | 73-77 | | 204-208 | 148-152 | |
| 13 | 10 | 0 | 43 | 34 | 0 | 101-103 | UNUSED | | 209-211 | UNUSED | |
| 14 | 11 | 0 | 44 | 35 | 0 | 104-108 | 78-82 | | 212-216 | 153-157 | |
| 15 | 12 | 0 | 45 | 36 | 0 | 109-111 | UNUSED | | 217-219 | UNUSED | |
| 16 | 87 | 1 | 46 | 179 | 1 | 112-116 | 83-87 | | 220-224 | 158-162 | |
| 17 | 13 | 0 | 47 | 37 | 0 | 117-119 | UNUSED | | 225 | 0 0 0 0 0 1 1 1 | |
| 18 | 14 | 0 | 48 | 38 | 0 | 120-124 | 88-92 | | 226-230 | 163-167 | |
| 19 | 15 | 0 | 49 | 39 | 0 | 125-127 | UNUSED | | 231 | 0 0 0 0 1 1 1 1 | |
| 20 | 16 | 0 | 50 | 40 | 0 | 128-132 | 93-97 | | 232-236 | 168-172 | |
| 21 | 133 | 1 | 51 | 225 | 1 | 133 | 0 0 0 0 0 1 1 1 | | 237-239 | UNUSED | |
| 22 | 17 | 0 | 52 | 41 | 0 | 134-138 | 98-102 | | 240-244 | 173-177 | |
| 23 | 18 | 0 | 53 | 42 | 0 | 139 | 0 0 0 0 1 1 1 1 | | 245 | 0 0 0 0 0 1 1 1 | |
| 24 | 19 | 0 | 54 | 43 | 0 | 140-144 | 103-107 | | 246-250 | 178-182 | |
| 25 | 20 | 0 | 55 | 44 | 0 | 145-147 | UNUSED | | | | |
| 26 | 139 | 1 | 56 | 231 | 1 | 148-152 | 108-112 | | | | |
| 27 | 21 | 0 | 57 | 45 | 0 | 153 | 0 0 0 0 0 1 1 1 | | | | |
| 28 | 22 | 0 | 58 | 46 | 0 | 154-158 | 113-117 | | | | |
| 29 | 23 | 0 | 59 | 47 | 0 | 159 | 0 0 0 0 1 1 1 1 | | | | |
| 30 | 24 | 0 | 60 | 245 | 1 | 160-164 | 118-122 | | | | |

| MASKING FUNCTION = 0 0 1 1 1 1 1 1 | | CONTENTS OF FRAME COUNTER | | | | | | |
|---|---|---|---|---|---|---|---|---|
| FRAME | BASE ADDRESS DETERMINED BY ADDRESS WORD 16 | $2^5$ | $2^4$ | $2^3$ | $2^2$ | $2^1$ | $2^0$ | MEMORY LOCATION INDIRECTLY ADDRESSED |
| 1 | 88 | 0 | 0 | 0 | 0 | 0 | 0 | 88 |
| 6 | 88 | 0 | 0 | 1 | 0 | 0 | 0 | 96 |
| 11 | 88 | 0 | 1 | 0 | 0 | 0 | 0 | 104 |
| 16 | 88 | 0 | 1 | 1 | 0 | 0 | 0 | 112 |
| 21 | 88 | 1 | 0 | 0 | 0 | 0 | 0 | 120 |
| 26 | 88 | 1 | 0 | 1 | 0 | 0 | 0 | 128 |

STORED PROGRAM FORMAT GENERATOR

BACKGROUND OF THE INVENTION

The invention pertains to stored program format generators for sequentially accessing a plurality of data channels at different sampling rates.

Stored program format generators are used to control the sampling of a plurality of data channels each coupled to a data producing unit such as a temperature sensor. These generators have found extensive use in the space vehicle environment. In such an environment, numerous data producing units must be sequentially monitored at different sampling rates to check spacecraft operating conditions.

The format generator may be viewed as a small fixed program computer in that it is an autonomous unit which has storage, makes logical decisions, has a timing unit, an arithmetic unit and an output interface. The generator may be started locally by manual depression of a start switch, remotely by receipt of a start command or automatically with "power on." Once started, the generator will repeatedly cycle through its format until the receipt of a reset signal or until a "power down" condition is generated. The generator storage and its associated logic controls the data channel accessing sequence. When a data channel is accessed its associated data unit transmits its condition.

FIG. 1 is a table illustrating a typical format for accessing 182 data channels. The data channels are divided into four groups with Group I containing 47 data channels, each of which is sampled at the rate of 120 times per second. The Group IV channels, of which there are 60, are sampled at a rate of 4 times per second. The Group II and Group III channels are sampled respectively at the rates of 24 times per second and 12 times per second.

The data channels are serially accessed in a time division manner with a frame being defined as the sampling time for the channels in the most frequently sampled group. With reference to FIG. 1, Group I channels are the most frequently sampled channels with each channel being sampled every 1/120 of a second. Therefore, a frame in this example is 1/120 of a second. The Group IV channels are sampled every one-fourth of a second and therefore each of the Group IV channels are sampled once every 30 frames. Similarly, since each of the Group II channels is sampled once every one twenty-fourth of a second, each of the channels is sampled once every five frames. A major frame is defined as the number of frames required for sampling every channel at least once.

The sampling repetition sequence in terms of the frame count is called the subcommutation factor. Thus, Group II channels have a subcommutation factor of 5, each channel being sampled once every five frames, while the Group III and Group IV channels have respectively subcommutation factors of 10 and 30.

During each frame, the format generator memory is accessed by address words addressing memory locations which, for Group I channels, store the actual address of the sampled channels. When addressing the memory for subcommutated data channels, means must be provided for generating for each subcommutation group a different channel address during each frame. More specifically, 47 memory locations are needed to store the 47 Group I data channel addresses. Therefore, 47 address words in each frame access these 47 memory locations. However, each of the 35 channels in Group II is not sampled once each frame but once every 5th frame. Therefore, during each frame seven address words must be used to access seven of the 35 Group II channels, with the same seven channels being accessed again five frames later.

In prior stored program format generators, a read/write memory was required and a separate counter had to be associated with each subcommutation factor. When accessing subcommutation channels, the subcommutation address word accessed a memory location which functioned as an indirect address for the desired channel address. After accessing the memory location specified by the contents of the subcommutation word addressed memory location, the contents of the subcommutation word addressed memory location was incremented by one to address a new memory location containing another data channel address during the next frame.

In addition to the problems associated with the equipment complexity of such prior format generators, there exists the problem of having to resynchronize the subcommutation counters at the start of each major frame to avoid continuing errors which have occurred during a previous major frame. A further problem revolves around the fact that several memory accesses are required for reading out each of the subcommutated data channel addresses and in some prior format generators the number of accesses required depended upon the subcommutation factor.

SUMMARY OF THE INVENTION

It is an object of this invention to overcome the time consumming requirement of several memory accesses for reading out a subcommutated data channel address by providing a format generator which requires only two memory accesses for reading out each subcommutated data channel address regardless of the subcommutation factor.

Another object is to alleviate the required use of several counters and the attendant resynchronization problem by providing a system using only one counter for controlling the subcommutation sequences.

Still another object is to provide a format generator which permits the use of read only memories.

These objects as well as other advantages are obtained by providing a stored program format generator which includes a single recycling frame counter, the contents of which are combined with stored masking functions addressed either directly or indirectly by subcommutation address words, a different masking function being associated with each subcommutation factor. The combined word acts as an address for accessing the memory location containing the desired data channel address.

BRIEF DESCRIPTION OF THE DRAWINGS

FIGS. 2*a* and 2*b* are a table illustrating the details of the sampling format of FIG. 1;

FIG. 7 illustrates the memory contents for the sampling format of FIG. 1 using the three memory access mode.

DETAIL DESCRIPTION OF THE PREFERRED EMBODIMENTS

Figures 1, 3:
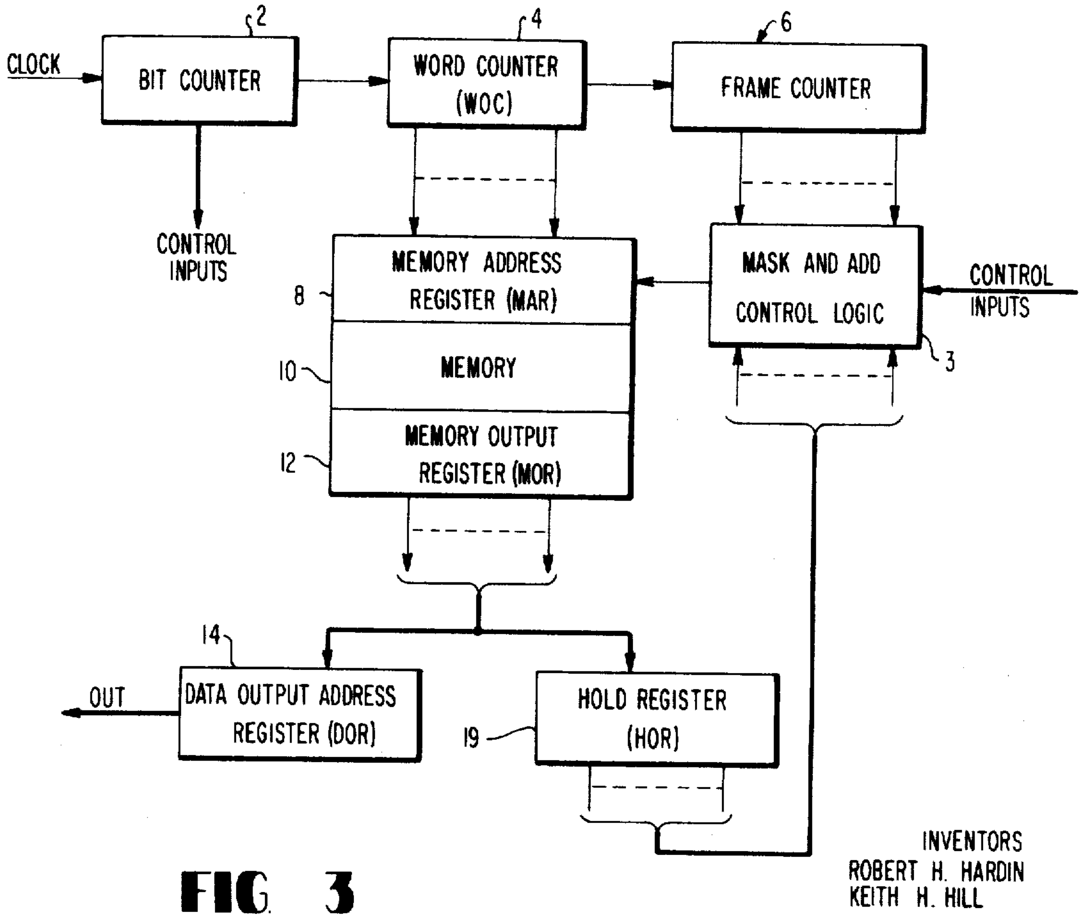
FIG. 1 is a table illustrating a typical multi-channel sampling sequence format.
FIG. 3 is a general block diagram of the format generator of the invention.

FIG. 2 formed of FIGS. 2*a* and 2*b* is a table illustrating the details of the sampling format of FIG. 1. In FIG. 2, the position of each channel in the major frame is illustrated. It should be noted that there are 60 words per frame and 30 frames per major frame. The required number of words per frame can be understood from the following. All the Group I channels must be accessed once each frame. Since each of the Group II channels must be accessed once every fifth frame and since there are 35 channels in Group II, seven words per frame must be alloted to Group II channels. Each of the Group III channels, of which there are 40, must be accessed once every 10 frames. Therefore, four words must be allotted to the Group III channels during each frame. Similarly, since each of the 60 channels in Group IV must be accessed once every 30 frames, two words per frame must be alloted to the Group IV channels. As a result, 60 address words per frame are required for the illustrated format.

It should be understood that all of the subcommutation sequences are assumed to be of the random type, although the numbers shown in FIG. 2 are sequential for clarity of illustration. Address words 1, 11, 21, 31, 41, 51, and 60 are selected to access Group II data channels during each frame. Address words 6, 26, 36, and 56 are selected to access Group III data channels during each frame, while address words 16, and 46 are selected to access Group IV data channel during each frame. In that these address words are used to indirectly access a subcommutated data channel address they are termed subcommutation address words. The remaining address words are used to directly access a Group I channel during each frame. It should be understood that the above noted address word assignment is for illustration purposes only.

FIG. 3 is a generalized block diagram of the format generator of this invention. All timing and synchronization is accomplished by the bit counter 2, word counter 4, and the frame counter 6. Details of the timing are explained below. The word counter recycles every frame after counting to 60 for the format illustrated in FIG. 1. Each count in the word counter 4 corresponds directly to either a direct address word or a subcommutation address word and is used to address the memory 10. The frame counter is used in the generation of subcommutation sequences. For the address words which are not associated with a subcommutated group, that is for direct address words, the memory is addressed by the contents of the word counter and the memory content at the addressed memory location is the corresponding data channel address which is to be accessed at that time. The data channel address is applied through a memory output register 12 to a data output register 14.

Whether the contents of an addressed memory location corresponds to a data channel address or not is determined in accordance with the teachings of this invention by the least significant bit stored in the addressed memory location. Therefore, for a 182 channel system, memory 10 must store nine bit words, eight bits for designating the data channel address with the nineth and least significant bit being utilized to indicate whether the memory location accessed is an actual data channel address or an indirect address of a subcommutated data channel. If the memory location contains an actual data channel address, the least significant bit is a binary zero. When the contents corresponds to an indirect address, the least significant bit is a binary one.

Figure 4:
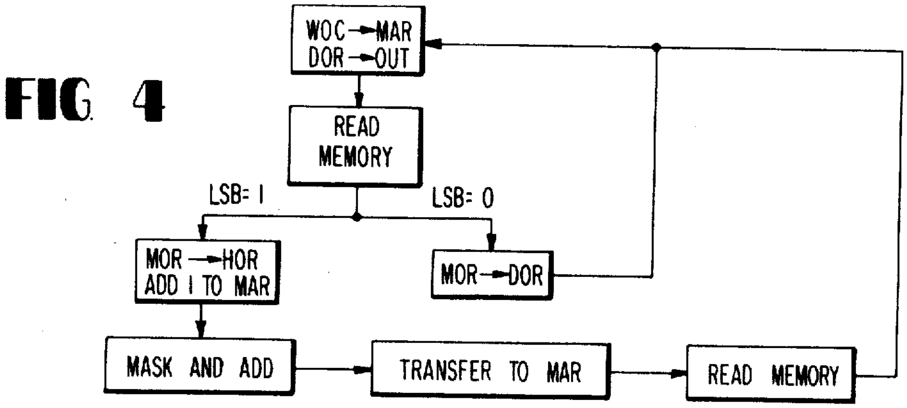
FIG. 4 is a flow diagram showing the operation of the format generator during the two memory access mode of operation.

Data flow in the two memory access mode of operation is best understood with reference to the flow diagram of FIG. 4. The contents of the word counter 4 are gated into the memory address register 8 where it is used to access a memory location in memory 10. The contents of the accessed memory location is then read out into the memory output register 12. If the least significant bit in the read out word is a binary zero, indicating an actual data channel address, the remaining eight bits in the memory output register are transferred to data output register 14 for sampling the selected data channel. The contents of word counter 4 are then incremented and gated into the memory address register 8 to access another memory location.

Let it be assumed that address word 6 is stored in the word counter. Address word 6 is a subcommutation address word. During frame 1, this subcommutation address word is used as an indirect address to retrieve data channel address 53. Therefore, the contents of the memory location accessed by address word 6 contains a binary one in its least significant bit position. In the two memory access mode, the remaining bit positions in the accessed memory location store a masking function which is to be combined with the contents of the frame counter 6. The masking function, as will be described in detail below, enables selected ones of a series of AND gates contained in the mask and add control logic 3 to pass the contents of correspondingly selected stages of the frame counter 6 to the add circuitry of control logic 3 where the arithmetic value of the selected stages is combined with the contents of the memory address register 8 to develop a new address word. This new address word accesses the memory to retrieve the desired data channel address. Since the frame counter is incremented each frame a different address is generated during each frame.

Thus, when the least significant bit position contains a binary one, the contents in the memory output register 12 which is now the masking function is transferred to the hold register 19. The masking function is applied to the mask and add control logic 3 where it is used to gate out the contents of selected stages of the frame counter. The contents of the selected stages are then combined with the contents of the memory address register 8 to develop another address word. The new address word is applied to the memory address register to access a memory location.

Figure 5:
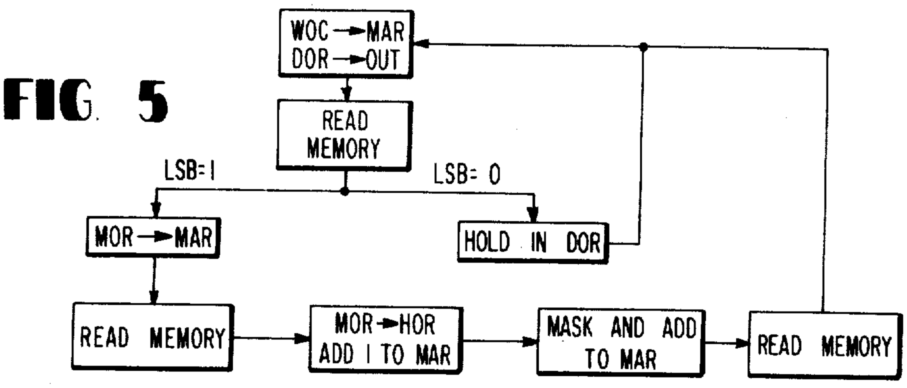
FIG. 5 is a flow diagram showing the operation of the format generator during the three memory access mode of operation.

FIG. 5 is a flow diagram of the operation of the generator of the present invention when operating in a three memory access mode of operation. The only difference between the three and two access modes of operation is that the contents of the memory location accessed by a subcommutation address word is another memory address rather than the masking function. This memory address is applied to the memory address register 8 to access a memory location storing a masking function. The operation of the generator continues as described with respect to the two mode of operation.

It is noted that in both FIGS. 4 and 5 that when a subcommutation sequence is encountered, the contents of the memory address register is incremented by one prior to its being combined with the masked frame counter output. This is necessary to provide a new address during frame 1 when the contents of frame counter 6 are all zeroes. This unit incrementing must be repeated each additional frame so that different memory locations are accessed during each frame.

The details of the generation of the masking function and the method in which it is combined with the frame counter count as well as the operation of the frame counter itself will now be explained with reference to a stored program format generator constructed in accordance with the teachings of this invention. The following discussion relates to the three memory access mode of operation.

Figure 6:
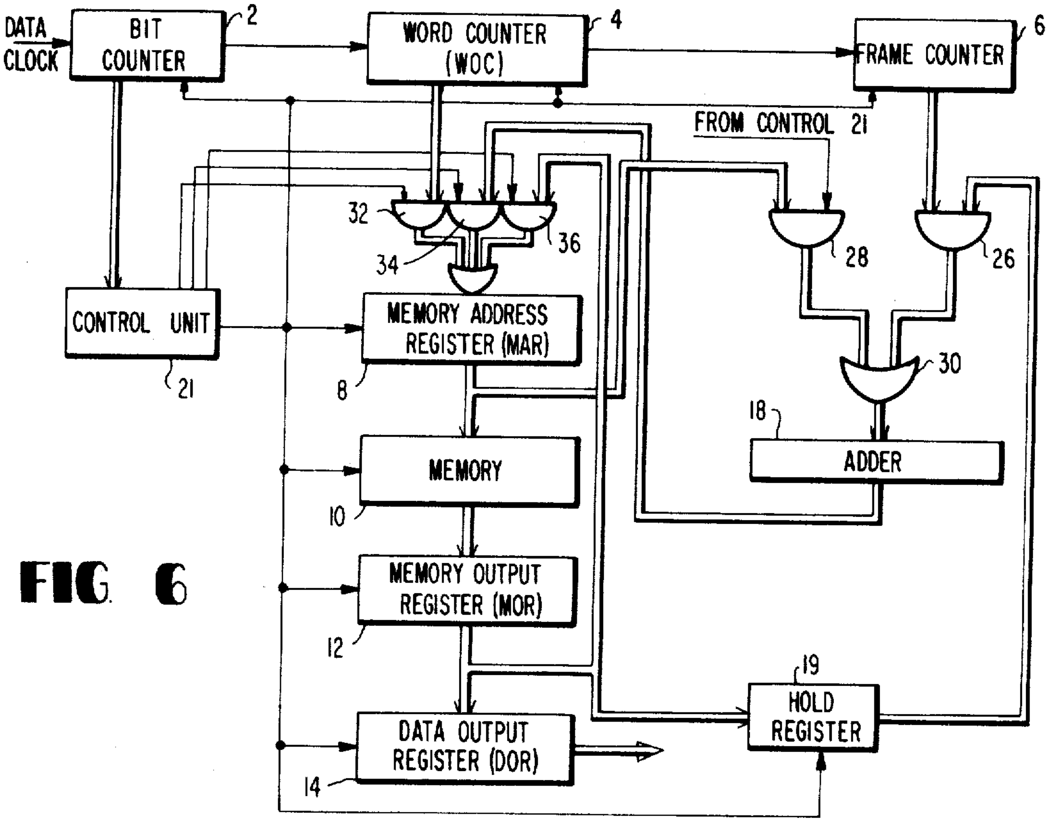
FIG. 6 is a detailed block diagram of the format generator showing the adder and its associated gating circuitry.

FIG. 6 is a more detailed block diagram of the stored program format generator of this invention with specific emphasis on the control of data flow in the three access mode of operation. Similarly labeled elements in FIGS. 3 and 6 signify identical elements.

When the address of a subcommutated data channel is to be read out, the contents of word counter 4 which would correspond to subcommutation address word, is gated to the memory address register 8 to access a location in memory. As with the two access mode, the addressed memory location contains in its least significant bit position a binary one to indicate that the retrieved memory contents is not a data channel address. In the three access mode of operation, the retrieved data, rather than being the masking function, as would be the case with the two access mode, is another memory address. This readout address is applied to the memory address register 8 from the memory output register through AND gate 36, a second input thereto being a timing control signal. It should be noted that each of the gates 32, 34 and 36 represents a plurality of gates for receiving, in parallel, data bits from the word counter 4, adder 18 and memory output register 12 respectively. In this case the eight AND gates represented by gate 36, receive the eight bits from the memory output register.

Memory 10 is now accessed at the new memory location to retrieve the masking function. The retrieved masking function is applied through the memory output register and hold register 19 to AND gate 26 where it enables the contents of selected stages of the frame counter 6 to pass to the adder 18. At the adder, the contents of gated frame counter stages are combined with the contents of the memory address register which has previously been incremented by one. The sum is returned to the memory address register through gate 34. The address in the memory address register now points to the memory location in memory 10 containing the address of the specific data channel which is to be accessed.

Details of the masking functions and how they control the indirect addressing of subcommutated data channels will now be described. The masking function is a logical word which enables selected ones of the AND gates 26 thereby passing the contents of selected stages of the frame counter 6 to adder 18. The number of stages which are gated to the adder depends upon the subcommutation factor associated with the subcommutation address word. For example, address word 1 is used to access the address of a data channel which is associated with Group II channels having a subcommutation factor of 5. Therefore, the three least significant stages of the frame counter 6 are required to access the five memory locations associated with word 1. After the five memory locations have been accessed, the frame counter is reset. Therefore, a masking function of 00000111 is associated with the subcommutation address word 1.

Group III data channels must be reaccessed every 10 frames. Considering address word 6, this address word accesses a memory location containing the address of another memory location which stores the corresponding masking function. Since ten memory locations must be accessed before recycling, provisions must be made to access five additional memory locations after the frame counter has reset on the count of five. The corresponding masking function for a subcommutation factor 10 is 00001111 which cooperate with the first four stages of the frame counter. The first three least significant bits designate five memory locations when added to the incremented contents of the memory address register, with the fourth bit providing the necessary counts for accessing five additional memory locations. It should be remembered that the first three stages in frame counter 6 are reset after a count of 5 (i.e., 0,1,2,3 and 4). When the first three stages recycle the fourth stage goes from a binary zero to a binary one. When the first three stages recycle for a second time, the fourth stage returns to a binary zero. Thus, the four stages recycle after 10 counts leaving three counts unused (5,6 and 7). This means that three memory locations must remain unused. The apparent inefficiency in the use of memory spaces is substantially out weighed by the previously outlined advantages of the present system.

When an address word, such as 11, is used to access channels having a subcommutation factor of 30, the corresponding masking function is 00111111. This masking function cooperates with six stages in the frame counter.

The three least significant bits in the frame counter are still used to identify five memory locations. These first three stages will be reset six times before the same memory location is again accessed.

FIG. 7 exemplifies the contents of memory 10 for the three access mode of operation. The manner in which the 30 memory locations associated with the address word 16 are accessed in accordance with the teachings of this invention will be explained with reference to this figure. Address word 16 accesses memory location 16 which contains a binary one in the least significant bit position. The remaining eight bit positions denote address 87. The contents of location 16 are read out to the memory output register 12 and back to the memory address register 8 through gate 36. When location 87 is addressed the masking function is readout and transferred to hold register 19 to selectively enable gates 26. Since a subcommutation sequence was indicated by the binary one in the least significant bit position in memory location 16, gate 28 is enabled by control unit 21 to increment the contents of the memory address register in the adder 18 thus generating a base address of 88. Address 88 is now combined with the gated contents of the frame counter 6 in adder 18. During frame 1 each stage in the frame counter contains a binary zero and therefore memory 10 is accessed at location 88.

Thus, during the first five frames, five data channels are accessed in response to address word 16, the five channel addresses being stored at memory locations 88-92.

During frame 11, still another memory location must be accessed to determine another data channel. At the start of the frame 11, the first three stages in the frame counter are recycled while the fourth and fifth stages are set to a binary one and binary zero respectively. Therefore, during frame 11 the combined address word (00010000) from adder 18 is used to access a location in memory defined as the base address 88 + 16, or address 104. During the remaining four frames (i.e., frames 12 – 15) memory locations 105–108 are accessed each time address word 16 appears in the word counter. Again certain of the memory locations must remain unused. During frame 16 a memory location corresponding to the base address 88 + 24 is accessed, while during frame 21 a memory location corresponding to base address 88 + 32 is accessed.

It now becomes clear that for the specific example set forth herein, frame counter 6 must contain a minimum of 6 stages. It should be understood however that for other formats frame counter 6 may have more or less stages.

Figures 8, 9:
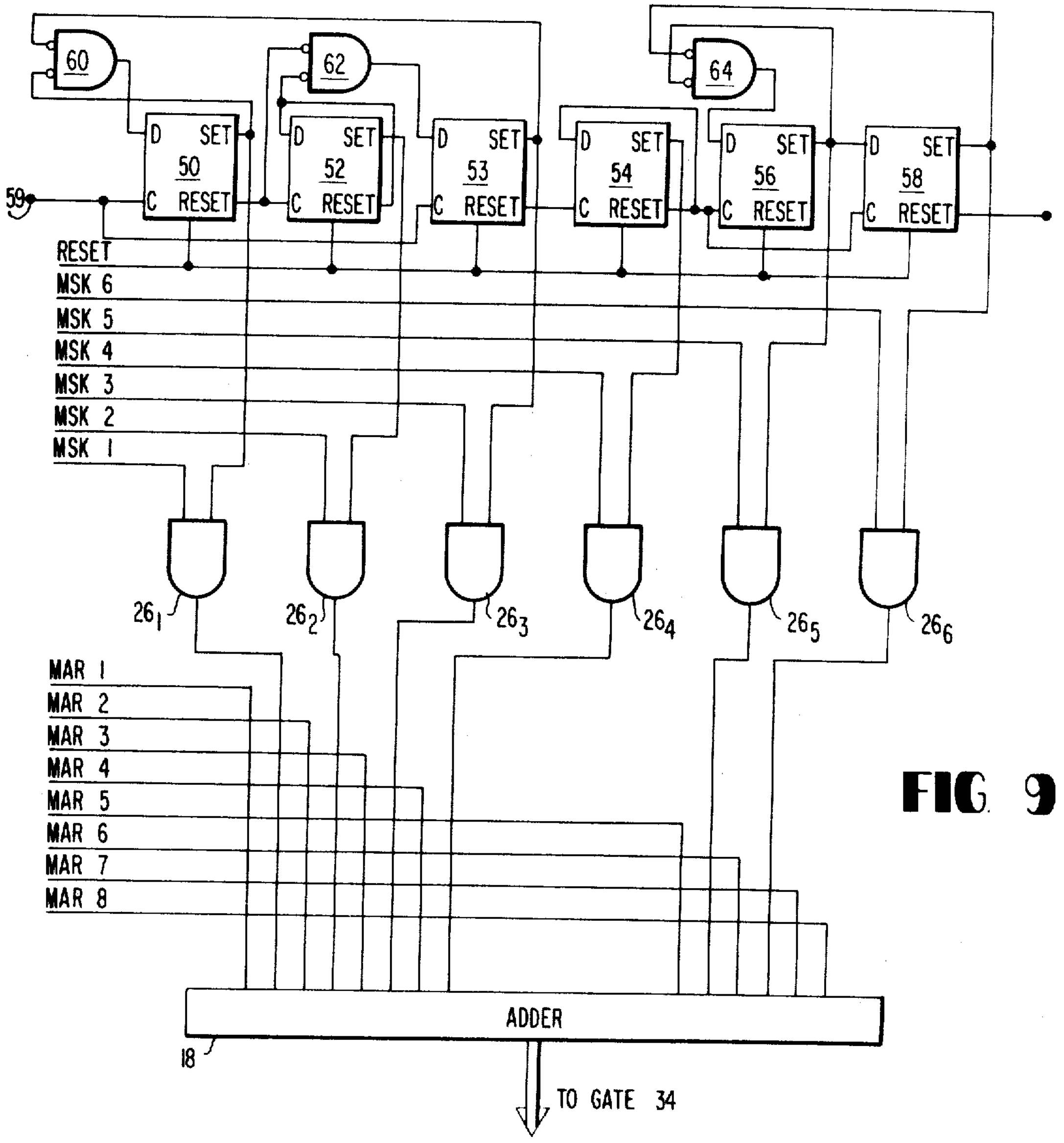
FIG. 8 is a table illustrating the addressing technique of the invention as applied to Group IV data channels.
FIG. 9 is a detailed logic diagram of a frame counter used with the format generator of the invention.

FIG. 8 illustrates the addressing technique for the Group IV data channels associated with address word 16. FIG. 8 shows the addressing for every fifth frame. It is understood, of course, that between frames 1 and 6, 6 and 11, 11 and 16, etc. the first three stages of the frame counter are incremented to access four additional memory locations.

FIG. 9 illustrates the details of the frame counter used to accomplish the incrementing as illustrated in FIG. 8. Flip-flops 50,52,53 54, 56 and 58 represent the six stages of the frame counter. These flip-flops may be of the D type wherein whatever is on the D input at the time the C input rises is set into the flip-flops. That is, if a binary one appears on the D input when the C input rises, the set side of the flip-flop goes to a binary one. The first three stages corresponding to the three least significant bits are represented by flip-flops 50, 52 and 53. Operation of these three stages are as follows.

Let it be assumed that all stages are initially at a binary 0. That is, the set output of each of the flip-flops is at binary zero or logic low, while the reset output is at binary one or logic high. When the word counter 4 is reset after a count of 60 indicating that the first frame has been completed, a signal to terminal 59 causes a rising signal at the C input of flip-flop 50.

Gates 60,62 and 64 are positive logic NOR gates and operate in the following manner. If either input is high the output is low. The output is high only when both inputs are low. Thus, since both flip-flops 50 and 53 contain a binary zero at their set outputs, the output of gate 60 is high and therefore the signal at terminal 59 causes the set output of flip-flop 50 to go to binary one. The rising signal at terminal 59 is also seen by the C input of flip-flop 53. However, since the output of gate 62 is low the set output of flip-flop 53 remains at binary zero. As a result, one input to AND gate $26_1$ raises to a logic high. AND gates $26_1$ through $26_8$ correspond to gate 26 in FIG. 5.

When the word counter 4 is incremented again after reaching a count of 60 thus indicating the end of frame 2, input terminal 59 again rises. The output of gate 60 at this time is at a logic low do to the fact that the set output of flip-flop 50 is applied as one input to the gate. Therefore, the rising signal at the C input causes the set output of flip-flop 50 to go to a binary zero and the reset output to a binary one. As the reset output of flip-flop 50 rises, the C input of flip-flop 52 also rises causing the set output of flip-flop 52 to go to a binary one since the binary one at the reset output of flip-flop 52 is fed back to the D input. When the input to terminal 59 rises for a third time thus indicating the beginning of the fourth frame, flip-flop 50 changes state. However, flip-flop 52 remains with its set output at a binary one. When the input 59 rises for the fourth time, flip-flop 50 changes state to raise its reset output to a binary one causing flip-flop 52 to also change state. This occurs because the D input to flip-flop 52 at the time the C input rises as a result of the toggling of flip-flop 50 is at binary zero.

Prior to the time when terminal 59 receives a rising signal for the fourth time, the reset outputs of flip-flops 50 and 52 were at binary zeroes, thus causing the output of gate 62,which appears as the input to the D side of flip-flop 53 to be at a logic high. Therefore, upon the occurrence of the fourth signal to terminal 59, the set output of flip-flop 53 goes to a binary one. The count in the first three stages of the frame counter now corresponds to the decimal number four.

The first three stages must now recycle to be ready for the sixth frame. When the word counter 4 resets, the input to the terminal 59 rises for the fifth time. Since the set output of flip-flop 53 is at binary one, the set output of flip-flop 50 remains at binary zero as does the set output of flip-flop 52. Since the reset outputs of flip-flops 50 and 52 are at binary ones, the output of gate 62 is at a logic low and thus the fifth signal at input terminal 59 causes the set output of flip-flop 53 to go to the binary zero thus placing the first three stages in then initial states. In the above described manner, the first three stages of frame counter 6 recycle every five frames.

When the subcommutation factor is greater than five, the resetting of the first three stages must cause the set output flip-flop 54 to raise to a binary one. It is initially assumed that prior to the resetting of the first three stages, the set outputs of the flip-flops 54, 56 and 58 are all at binary zeros. Therefore, when the reset output of flip-flop 53 rises, the set output of flip-flop 54 goes to binary one. The reset output of flip-flop 53 will not rise again until the first three stages recycle. When this occurs after frame 10, the rising C input to flip-flop 54 causes the reset output thereof to go to binary one causing the set output of flip-flop 56 to go to binary one. This results from the fact that at this time the output of gate 64 is at a logic high. When the first three stages are recycled for the third time, the set output of flip-flop 54 goes to a binary one while the state of flip-flop 56 remains the same. On the fourth recycling of the first three stages, flip-flop 54 changes state in that its reset output is at a logic low, while flip-flop 56 changes state in that the output of gate 64 is at a logic low. However, the set output of flip-flop 58 goes to a binary one due to the fact that the D input thereto is at a logic high resulting from the binary one at the set output of flip-flop 56 at a time when the C input rises as a result of the toggling of flip-flop 54.

When the first three stages recycle for the fifth time, flip-flop 54 changes state while flip-flops 56 and 58 remain unchanged. Upon the occurrence of the sixth recycling of stages 50, 52 and 53, flip-flop 54 changes state in that its D input is at a logic low. Flip-flop 56 remains unchanged in that the output of gate 64 is at a logic low. However, flip-flop 58 does change state in that the rising output from the reset output from flip-flop 54 causes the set output of flip-flop 58 to attain a binary zero. Therefore, the states of flip-flops 54,56 and 58 recycle after 30 frames. This is precisely the condition required to carry out the format illustrated above.

As seen from FIG. 9, the outputs from the flip-flops 50,52, 53,54, 56 and 58 are applied respectively to one input of each of the AND gates $26_1 - 26_6$, with the outputs of these gates being applied to adder 18. A second input to each of these gates is provided by lines MSK1 -MSK6 which carry the masking functions. Adder 18 also receives the output from the memory address register 8.

The operation as described above occurs sequentially and is controlled by control unit 21 receiving timing pulses from the bit counter 2. The bit counter recycles after a count of 8 and upon recycling sends an increment signal to the word counter 4. The primary inputs to the control unit 21 are the bit counter outputs and the system clocks, with a secondary input arising from the bit position in the memory output register corresponding to the least significant bit.

The control cycle begins at a time corresponding to a count of eight in bit counter 2. At this time the contents of the word counter 4 are incremented and transferred to the memory address register 8. The memory address register addresses the memory causing the contents of the addressed location to be passed to the memory output 12.

After time T8, bit counter 2 is reset such that the next clock pulse causes the counter to store a count of one corresponding to time T1. The transferring of the contents of the addressed location to the memory output register occurrs at time T1. If a binary one appears in the least significant bit position of the memory output register, the control unit is set to a subcommutation sequence. In the three address mode of operation, when the control unit has been placed in its subcommutation sequence, at time T2, the contents of the memory output register are strobed into the memory address register and at time T3, indicated by the output of a bit counter, the contents of the newly addressed location are strobed into the memory output register. The memory output register now stores the masking function. At time T4 the contents of the memory address register are gated into the adder 18 and incremented by one to develop the base address. During the T4 time interval the contents of the memory output register are not strobed into the hold register and therefore the contents of the frame counter have no effect upon the contents of the memory address register. At time T5 the contents of the memory output register are strobed through the hold register to gate 26 thus causing the contents of selected stages of frame counter 6 to be gated to the adder where the unmasked contents of the frame counter is added to the contents of the memory address register and the combined address supplied back into the memory address register. At time T6, the memory is again accessed and its contents strobed into the memory output register where it is held until time T8 when it is strobed into the data output register 14.

In the non-subcommutated cycle, the memory is accessed only once at time T1 and the data remains in the memory output register until it is strobed into the data output register at time T8.

Although the invention has been described with respect to the preferred embodiments thereof, it is understood by those skilled in the art that various modifications can be made in construction and arrangement within the scope of the invention.

What is claimed is:

1. A stored program format generator for sampling a plurality of data channels at different sampling rates, each channel in a first group of said plurality of channels being sampled once or more each frame, the remaining channels being sampled at rates less than once per frame, a master frame being the number of frames required to sample each of the data channels at least once, the number of frames per sample relative to each of said remaining channels being the channel subcommutation factor, said format generator including memory means for storing the addresses of said plurality of data channels, and address word generating means for accessing said memory means a predetermined number of times each frame, the memory locations addressed by said generated address words containing a data channel address and indications of a subcommutation sequence, those generated address words accessing memory locations storing an indication of a subcommutation sequence being termed a subcommutation address word, the improvement comprising:

a. a frame counter, b. means responsive to a subcommutation address word for masking selected stages of said frame counter and, c. means for combining an address word with the contents of the unmasked stages of the frame counter to produce a different address word.

2. The format generator of claim 1, wherein said memory means stores masking functions for masking selected stages of said frame counter, a subcommutation word accessing a memory location storing an indication of a subcommutation sequence and a masking function, said means for masking further including: means for reading out said masking functions, and gate means, receiving said masking function and the contents of said frame counter, for generating an output corresponding to the contents of the unmasked stages of the frame counter.

3. The format generator of claim 1, wherein said memory means stores masking functions for masking selected stages of said frame counter, said subcommutation words accessing a memory location storing an indication of a subcommutation sequence and a further memory address, said means for masking further including: means for addressing an additional memory location specified by said further memory address said additional memory location storing a masking function, means for reading out the masking function, and gate means receiving said masking function and the contents of said frame counter for generating an output corresponding to the contents of the unmasked stages of the frame counter.

4. The format generator of claim 2, wherein said means for combining includes means for incrementing said subcommutation word, said incremented subcommutation word being combined with the output of said gate means.

5. The format generator of claim 3, wherein said means for combining includes means for incrementing said further memory address, said further memory address being combined with the output of said gate means.

6. The format generator of claim 2, wherein said frame counter is an $n$ stage counter including $i$ stages providing an output count at least equal to the minimum subcommutation factor, said frame counter including means for recycling said $i$ stages after reaching a count corresponding to said minimum subcommuntation factor.

7. The format generator of claim 6, wherein the subcommutation factors associated with the remaining data channels are integral multiples of the minimum subcommutation factor, the $(n-i)$ stages of said frame counter providing a count at least equal to the ratio of the maximum subcommutation factor associated with the remaining data channels to the minimum subcommutation factor; said frame counter further comprising means for recycling said $(n-i)$ stages after said $(n-i)$ stages generate a count equal to said ratio.

* * * * *